Figure 4:
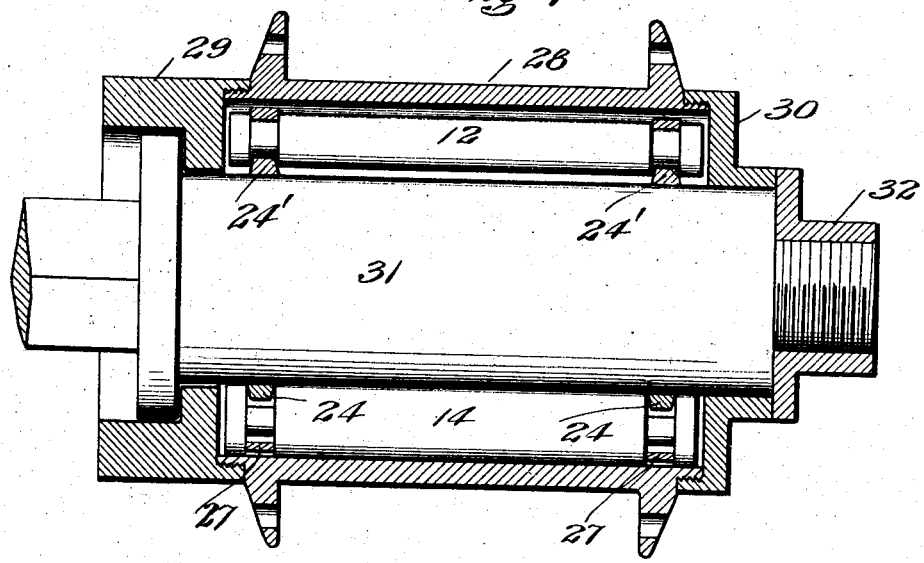

No. 839,084. PATENTED DEC. 18, 1906.
W. T. FLEMING.
ROLLER BEARING.
APPLICATION FILED OCT. 18, 1905.
2 SHEETS—SHEET 1.
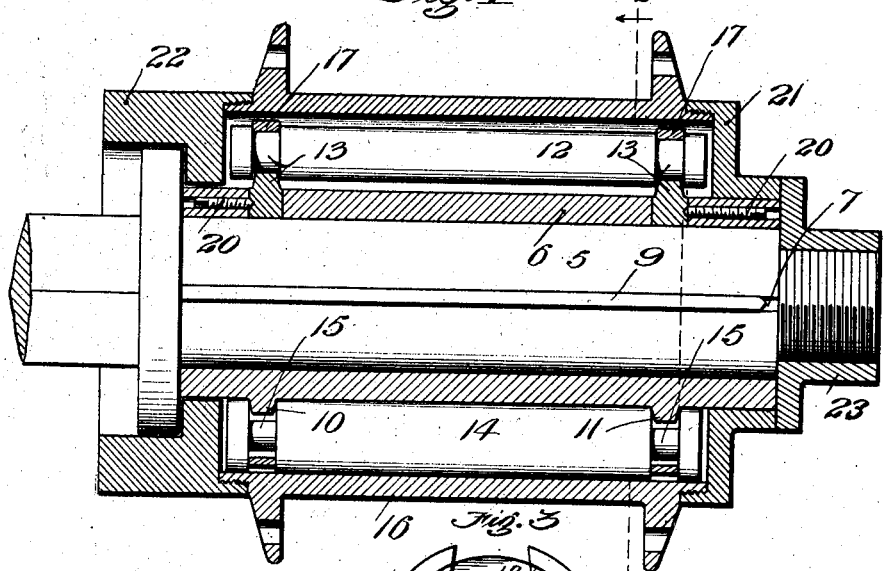
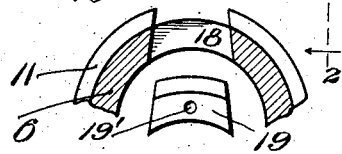
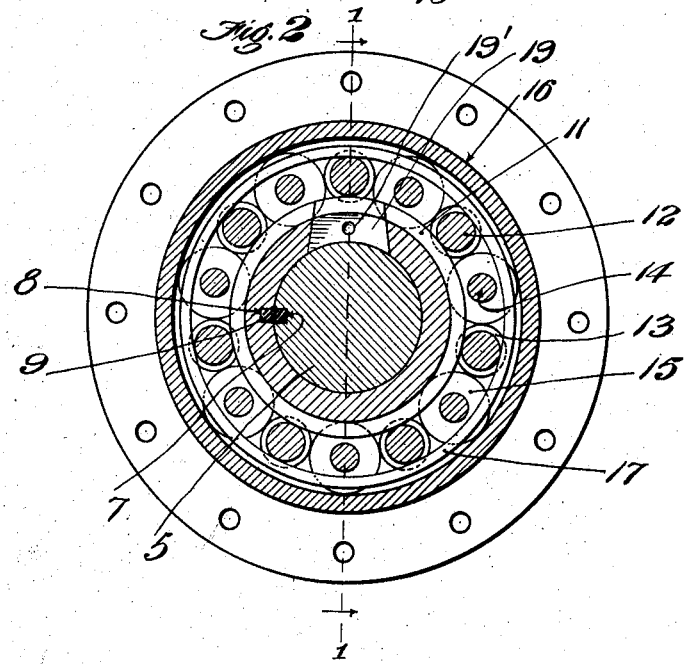
Witnesses
Inventor
William T. Fleming
By Hazard & Harpham
Attorneys.

No. 839,084.  
PATENTED DEC. 18, 1906.  
W. T. FLEMING.  
ROLLER BEARING.  
APPLICATION FILED OCT. 18, 1905.

2 SHEETS—SHEET 2.

Witnesses  
Inventor  
William T. Fleming  
Hazard & Harpham  
Attorneys.

UNITED STATES PATENT OFFICE.

WILLIAM T. FLEMING, OF LOS ANGELES, CALIFORNIA, ASSIGNOR, BY MESNE ASSIGNMENTS, TO THE ANTI-FRICTION JOURNAL BOX COMPANY, OF LOS ANGELES, CALIFORNIA, A CORPORATION OF CALIFORNIA.

ROLLER-BEARING.

No. 839,084.    Specification of Letters Patent.    Patented Dec. 18, 1906.

Application filed October 18, 1905. Serial No. 283,307.

*To all whom it may concern:*

Be it known that I, WILLIAM T. FLEMING, a citizen of the United States, residing at Los Angeles, in the county of Los Angeles and State of California, have invented new and useful Improvements in Roller-Bearings, of which the following is a specification.

My invention relates to improvements in the construction of the rollers of the bearing and guides therefor and in the spacer-rollers and in the means for assembling and holding the rollers together; and the object thereof is to provide a roller-bearing in which the bearing-rollers will be evenly held and in which the parts can be united together and handled as a unitary body.

In the drawings forming a part of the application I have illustrated my invention as applied to an axle and wheel, the box of the wheel only being shown; but my invention is equally applicable to bearings where one part is rotatable within or exterior to the other part.

Figure 5:
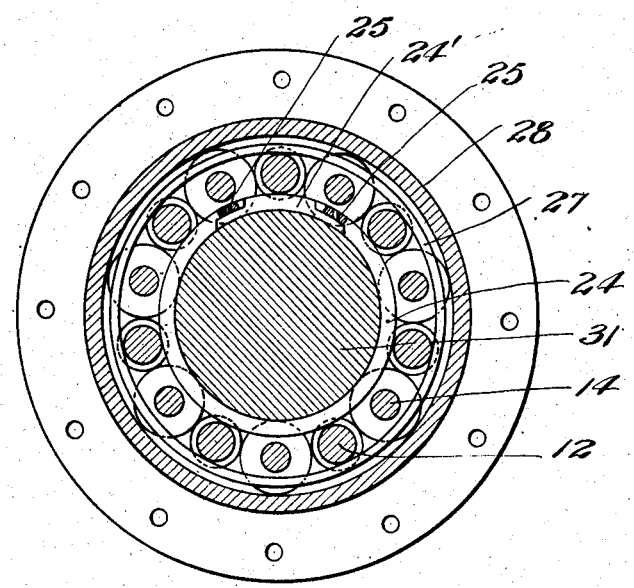

Figure 1 is a section on the line 1 1 of Fig. 2. Fig. 2 is a section on the line 2 2 of Fig. 1. Fig. 3 is a detail of a part of the spacer-roller-supporting track. Figs. 4 and 5 show a modification of the invention shown in the other figures.

Upon the end of the axle 5 is mounted a sleeve 6. A key-seat 7 is provided in the axle, and in the sleeve is a keyway 8. In this key-seat is mounted a key 9, which prevents the sleeve from rotating upon the axle. Near each end the sleeve is provided with annular flanges 10 and 11, which form guides and supports for the ends of the spacing-rollers 12, which rollers are provided near the ends thereof with grooves 13, which straddle the flanges of the sleeve. These grooves are deep enough to prevent the spacing-rollers from having an endwise motion, but not deep enough to permit the body of the spacing-roller to engage the sleeve. The bearing-rollers 14 are provided near the ends thereof with grooves 15, which straddle the flanges of the sleeves. These grooves are so deep that within the grooves the necks of the bearing-rollers do not touch the flanges. The bearing-rollers have a greater diameter than the spacing-rollers in those portions thereof which bear against the sleeve and the hub 16 of the wheel, while those portions of the bearing-rollers within the grooves at the ends are of less diameter than the portions of the spacing-rollers within the grooves at the ends thereof, so that the necks of the bearing-rollers at the grooves do not engage the flanges of the sleeve, but the necks of the spacer-rollers do engage the flanges within the grooves at the ends thereof. These flanges form supporting-tracks for the supporting-rollers and guides for both rollers. Surrounding these rollers and within the grooves at the ends thereof are the assembling and holding rings 17, which engage with the necks of the spacing-rollers within their grooves and are free from the necks of the bearing-rollers within their grooves.

In order to assemble the parts, I cut apertures 18 at each end of the sleeve, which also cuts away a portion of the flanges, removing so much thereof as is necessary to enable me to insert a bearing-roller between the sleeve and the holding-rings when the holding-rings are pushed upwardly and away from said apertures as far as they can go. I first place all of the bearing-rollers upon the sleeve with their end grooves inclosing the holding-rings. I then slip a spacing-roller through the cut-away portion of the flanges and drop the same down at one side thereof and bring a bearing-roller over to rest on this spacing-roller. I then slip another spacing-roller through this cut-away portion of the flanges and bring it to the same side as the other spacing-roller and then bring a bearing-roller over on top of it and repeat the operation until all of the spacing-rollers are in place. I then insert from the inside of the sleeve into each aperture in the sleeve an insertible flange-section 19, which is of such shape as to fill the aperture in the sleeve and to complete the flanges on the sleeve. A screw 20 passes into the sleeve at each end and slightly into section 19, a small hole 19' being provided therefor, so as to prevent the same from falling out. The sleeve and rollers are then placed within the hub and held therein by means of screw dust-caps 21 and 22 at each end thereof. The sleeve is then slipped upon the axle and is held in place thereon by the retaining-nut 23.

By this construction a roller-bearing is provided which can be handled as a unitary body, and in which the bearing-rollers are evenly held apart by the spacing-rollers, and in which the spacing-rollers are held from contact with the outer member and from contact with the inner member except within the grooves at the ends of the spacing-roller, thereby providing a superior roller-bearing.

In the modification shown in Figs. 4 and 5 the sleeve is dispensed with and the guiding and supporting tracks for the ends of the rollers consist of rings 24, which are provided with removable sections 24', which may be secured to the main portion of the ring by means of dowel-pins 25. In this construction the removable section of the inner ring or guide-track is removed and the supporting and spacing rollers are placed alternately between the track-ring 24 and the holding or assembling ring 27, which is of the same character and construction and performs the same function as rings 17 in the construction shown in the other figures. After the last roller is placed between the track-ring 24 and the assembling-ring 27 the removable sections of the track-rings are secured in place and the rollers and rings slipped within the hub 28 and the dust-caps 29 and 30 screwed thereon. The hub is then slipped upon the axle 31 and is held in place by the usual retaining-nut 32.

To prevent any longitudinal movement of the rollers within the hub, the outer end of the axle is reduced and a collar 33, provided with a removable section 33', is placed on the reduced portion of the axle and is held in place thereon by the usual retaining-nut 32. This collar is provided with a track-ring 34, which is made integral therewith, and the removable section 33' is held in place by the screw 35.

Having described my invention, what I claim as new, and desire to secure by Letters Patent, is—

1. A roller-bearing comprising bearing and spacing rollers alternately arranged, each of said rollers having grooves near the ends thereof, one groove at each end, the grooves in the bearing-rollers being deeper than those in the spacing-rollers and the bodies of the bearing-rollers within the grooves being of less diameter than the bodies of the spacing-rollers within their grooves and of greater diameter than the spacing-rollers except at the grooves; holding-rings within the grooves on the outer sides of said rollers, said holding-rings engaging the bodies of the spacing-rollers within the grooves; track-rings within the grooves of said rollers on their inner sides, said track-rings having each a removable section and engaging the bodies of the spacing-rollers within the grooves; an inner member within said rollers and track-rings and engaging the track-rings and bearing-rollers; and an outer member surrounding said rollers and engaging the bearing-rollers.

2. A bearing composed of an inner member having a plurality of separated peripheral annular flanges, there being a single flange at each end; bearing-rollers having grooves therein registering with all the flanges of the inner member, said grooves being deeper than the height of said flanges; spacing-rollers intermediate the bearing-rollers having grooves therein registering with and straddling all the flanges of the inner member; said grooves being of a depth to permit the spacing-rollers to engage the flanges and be supported thereby but not to permit of the spacing-rollers contacting with the inner member at any other point; means to hold said rollers together upon said inner member; and an outer member adapted to slip over the bearing-rollers and be supported thereby.

3. In an antifriction-bearing, the combination of a hub; an axle provided with a keyway; a key in said keyway; a sleeve having a keyway therein on said axle, said sleeve having a plurality of separated annular flanges near the ends thereof, each flange having a removable portion, said sleeve also having an aperture at each end thereof which registers with the flanges; bearing-rollers having grooves therein registering with the flanges on the sleeve, said grooves being deeper than the height of said flanges; spacing-rollers intermediate the bearing-rollers, said spacing-rollers having grooves in the ends thereof adapted to fit over the flanges of the sleeve, said spacing-rollers being supported by said flanges out of engagement with the sleeve except at the flanges and out of engagement with the hub; insertible sections for said flanges, said insertible sections also filling said apertures in said sleeve; and retaining-rings in the grooves in said rollers, said rings engaging the spacing-rollers within the groove but not engaging the bearing-rollers within the grooves.

In witness that I claim the foregoing I have hereunto subscribed my name this 12th day of October, 1905.

WILLIAM T. FLEMING.

Witnesses:
G. E. HARPHAM,
MARGARETE C. NICKELESON.